(12) United States Patent
Busschbach

(10) Patent No.: US 9,049,187 B2
(45) Date of Patent: Jun. 2, 2015

(54) CONNECTIVITY, ADJACENCIES AND ADAPTATION FUNCTIONS

(71) Applicant: Alcatel-Lucent, Paris (FR)

(72) Inventor: Peter Busschbach, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 137 days.

(21) Appl. No.: 13/861,706

(22) Filed: Apr. 12, 2013

(65) Prior Publication Data
US 2013/0227169 A1    Aug. 29, 2013

Related U.S. Application Data

(62) Division of application No. 12/318,766, filed on Jan. 8, 2009, now Pat. No. 8,495,245.

(51) Int. Cl.
| | |
|---|---|
| *G06F 15/173* | (2006.01) |
| *H04L 29/06* | (2006.01) |
| *H04L 12/24* | (2006.01) |
| *H04L 12/733* | (2013.01) |

(52) U.S. Cl.
CPC .............. *H04L 69/08* (2013.01); *H04L 41/12* (2013.01); *H04L 41/5006* (2013.01); *H04L 41/5019* (2013.01); *H04L 41/5048* (2013.01); *H04L 41/5077* (2013.01); *H04L 45/126* (2013.01)

(58) Field of Classification Search
USPC ........... 709/200, 226, 230, 238, 241; 370/466
See application file for complete search history.

(56) References Cited

U.S. PATENT DOCUMENTS 5,768,501 A * 6/1998 Lewis ............................. 714/48
6,011,780 A * 1/2000 Vaman et al. ................. 370/237
(Continued)

FOREIGN PATENT DOCUMENTS

CN     101184064     5/2008
EP     1 598 982     11/2005
(Continued)

OTHER PUBLICATIONS

Chinese Office Action and English translation thereof dated Jul. 18, 2013.

(Continued)

*Primary Examiner* — Anthony Mejia
(74) *Attorney, Agent, or Firm* — Harness, Dickey & Pierce, P.L.C.

(57) ABSTRACT

Example embodiments are directed to a method of publishing an element template from a first service provider to an administrative owner to determine an optimal end-to-end connectivity path from a source to a destination across at least one resource domain for data transport. The method includes determining, at the first service provider, adjacencies between a first resource domain of the first service provider and a second resource domain of a second service provider. The first service provider publishes to an administrative owner, an element template that identifies connectivity attributes, including adjacencies and adaptation capabilities of the first resource domain. The AO may develop a plurality of possible paths from a source end-point to a destination end-point to transmit data based on the element template from the first service provider and element templates from other service providers. The AO selects an optimal path from the plurality of possible paths.

6 Claims, 11 Drawing Sheets

(56) References Cited

U.S. PATENT DOCUMENTS

| | | | |
|---|---|---|---|
| 6,324,183 B1* | 11/2001 | Miller et al. | 370/467 |
| 6,584,093 B1 | 6/2003 | Salama et al. | |
| 6,967,972 B1* | 11/2005 | Volftsun et al. | 370/466 |
| 7,003,171 B1* | 2/2006 | Takeo | 382/251 |
| 7,085,286 B2* | 8/2006 | Dias et al. | 370/466 |
| 7,152,157 B2* | 12/2006 | Murphy et al. | 713/100 |
| 7,215,644 B2* | 5/2007 | Wu et al. | 370/248 |
| 7,269,157 B2* | 9/2007 | Klinker et al. | 370/351 |
| 7,349,427 B1* | 3/2008 | Canning et al. | 370/466 |
| 7,397,802 B2* | 7/2008 | Maeno | 370/395.31 |
| 7,486,695 B1* | 2/2009 | AbdelAziz et al. | 370/466 |
| 7,555,546 B1* | 6/2009 | Anumala | 709/224 |
| 7,567,553 B2* | 7/2009 | Morris | 370/352 |
| 7,720,056 B1* | 5/2010 | Lohtia et al. | 370/389 |
| 7,734,796 B2 | 6/2010 | Schlene et al. | |
| 7,761,584 B2* | 7/2010 | Langworthy et al. | 709/230 |
| 7,765,312 B2* | 7/2010 | Monette et al. | 709/229 |
| 7,894,464 B2* | 2/2011 | Hurwitz et al. | 370/419 |
| 8,046,475 B2* | 10/2011 | Das | 709/228 |
| 2003/0002526 A1* | 1/2003 | Dias et al. | 370/466 |
| 2003/0007624 A1* | 1/2003 | Handel et al. | 379/220.01 |
| 2003/0016678 A1* | 1/2003 | Maeno | 370/400 |
| 2003/0087646 A1* | 5/2003 | Funato et al. | 455/456 |
| 2004/0039726 A1* | 2/2004 | Shimizu et al. | 707/1 |
| 2004/0072557 A1* | 4/2004 | Paila et al. | 455/414.1 |
| 2004/0184441 A1* | 9/2004 | Wu et al. | 370/351 |
| 2005/0108169 A1* | 5/2005 | Balasubramanian et al. | 705/50 |
| 2005/0152284 A1* | 7/2005 | Kotha et al. | 370/254 |
| 2005/0193222 A1* | 9/2005 | Greene | 713/201 |
| 2005/0198250 A1* | 9/2005 | Wang | 709/223 |
| 2005/0259655 A1* | 11/2005 | Cuervo et al. | 370/392 |
| 2005/0262232 A1* | 11/2005 | Cuervo et al. | 709/223 |
| 2005/0267984 A1* | 12/2005 | Costa-Requena et al. | 709/238 |
| 2006/0080352 A1* | 4/2006 | Boubez et al. | 707/102 |
| 2006/0085560 A1* | 4/2006 | Langworthy et al. | 709/246 |
| 2006/0182038 A1* | 8/2006 | Nalawade et al. | 370/252 |
| 2006/0200579 A1* | 9/2006 | Vasseur et al. | 709/238 |
| 2006/0248206 A1* | 11/2006 | Moerdijk et al. | 709/230 |
| 2006/0277305 A1* | 12/2006 | Bernardin et al. | 709/226 |
| 2006/0277307 A1* | 12/2006 | Bernardin et al. | 709/226 |
| 2007/0019633 A1* | 1/2007 | Tomar et al. | 370/352 |
| 2008/0049622 A1* | 2/2008 | Previdi et al. | 370/237 |
| 2008/0056264 A1* | 3/2008 | Ong | 370/392 |
| 2008/0056282 A1* | 3/2008 | Moon | 370/401 |
| 2008/0068983 A1* | 3/2008 | Dunbar et al. | 370/216 |
| 2008/0163247 A1* | 7/2008 | Musial et al. | 719/313 |
| 2008/0172497 A1* | 7/2008 | Mohan et al. | 709/249 |
| 2008/0219272 A1* | 9/2008 | Novello et al. | 370/401 |
| 2009/0034511 A1* | 2/2009 | Hundscheidt et al. | 370/352 |
| 2009/0059800 A1* | 3/2009 | Mohan | 370/241.1 |
| 2009/0070486 A1* | 3/2009 | Visser | 709/238 |
| 2009/0086725 A1* | 4/2009 | Lai et al. | 370/352 |
| 2009/0157900 A1* | 6/2009 | Ge et al. | 709/236 |
| 2009/0279444 A1* | 11/2009 | Ravindran et al. | 370/252 |
| 2009/0300712 A1* | 12/2009 | Kaufmann et al. | 726/1 |
| 2009/0319329 A1* | 12/2009 | Aggarwal et al. | 705/10 |
| 2010/0004763 A1* | 1/2010 | Murakami et al. | 700/83 |
| 2010/0118771 A1* | 5/2010 | Lee et al. | 370/328 |
| 2010/0174814 A1* | 7/2010 | Busschbach | 709/226 |
| 2010/0191954 A1* | 7/2010 | Kim et al. | 713/150 |
| 2010/0284413 A1* | 11/2010 | Abdullah et al. | 370/401 |
| 2010/0290437 A1* | 11/2010 | Wang et al. | 370/335 |
| 2010/0309924 A1* | 12/2010 | Harrison et al. | 370/401 |
| 2010/0322213 A1* | 12/2010 | Liu et al. | 370/338 |
| 2011/0128975 A1* | 6/2011 | Kang et al. | 370/477 |
| 2012/0002654 A1* | 1/2012 | Pekkala et al. | 370/338 |

FOREIGN PATENT DOCUMENTS

| | | |
|---|---|---|
| JP | 2005-502275 | 1/2005 |
| JP | 2007-060218 | 3/2007 |
| WO | WO 02/06973 | 1/2002 |
| WO | WO 2006/000467 | 1/2006 |

OTHER PUBLICATIONS

"Generic Functional Architecture of Transport Networks," Series G: Transmission Systems and Media, Digital Systems and Networks. International Telecommunication Union (ITU-T) G.805, Section 3 (pp. 2-4) and Figures 1/G/805 and 2/G.805 (pp. 7-9) Mar. 2000.

S. Bryant, Ed. And P. Pate, Ed. "Pseudo Wire Emulation Edge-to-Edge (PWE3), Architecture." Network Working Group, Mar. 2005, The entire document.

L. Martini, Ed., E. Rosen, N. El-Aawar and G. Heron, Encapsulation Methods for Transport of Ethernet over MPLS Networks. Apr. 2006, The entire document.

"Adjacencies (previously known as Association Points)," IPsphere Forum, RAWG Contribution, Section 2 (pp. 5 and 6) Sep. 2007.

PCT International Search Report dated Mar. 31, 2010.

Japanese Office Action and English translation thereof dated Feb. 12, 2013.

Okamoto, S. , "Multi-ASON and GMPLS network domain interworking challenges," IEEE Cominunications Magazine, 2008, pp. 88-93.

Preliminary Report on Patentability dated Jul. 21, 2011.

* cited by examiner

CONNECTIVITY, ADJACENCIES AND ADAPTATION FUNCTIONS

BACKGROUND

This application is a divisional application of and claims priority under 35 U.S.C. §120/121 to U.S. application Ser. No. 12/318,766 filed Jan. 8, 2009, the contents of which are hereby incorporated herein by reference in their entirety and for all purposes.

Telecommunication service providers are able to provide data services across their networks. In order to increase the area over which data may be transmitted, service providers can contract data transport services from other service providers.

For example, a service provider who wishes to provide global IP virtual private network (VPN) services might contract transport services from access providers to reach enterprise sites that are not directly connected to the service provider's domain.

Traditionally, service providers use a manual process to negotiate and contract transport services. However, with an increased need for fast service delivery, service providers have an incentive to establish a cross-provider service management layer that allows them to interact and buy each other's services through an automated process.

For example, through such an automated process, one service provider could offer transit service, e.g., transport for data traffic, and another service provider can purchase the offered transit service. However, there is uncertainty as to what information a service provider needs to advertise to enable another service provider to create end-to-end connectivity across multiple domains without sacrificing the service provider's security.

Traditionally, the general solution is to use a routing protocol such as Border Gateway Protocol (BGP) to advertise connectivity. However, BGP does not allow service providers to take into account commercial, regulatory and other constraints that determine which end-to-end connectivity options are acceptable and/or optimal. For other transport protocols, such as Ethernet, alternative solutions would be required.

To address these issues adjacencies and Inter-carrier Interfaces were defined in "Adjacencies (previously known as Association Points)." *IPsphere Forum, RAWG Contribution*, September 2007. An adjacency is the existence of connectivity between two resource domains. An adjacency includes one or more Inter-carrier Interfaces (ICIs) between the two resource domains. An ICI is a physical interface between two service providers. More specifically, an ICI is a direct physical interface between two network elements that are owned and operated by two different service providers.

An adjacency specifies the existence of ICIs without specifying every ICI. This allows neighboring service providers to advertise connectivity between their networks without allowing other service providers to know how many physical interfaces (and the exact nature of those interfaces) exist between the neighboring service providers.

A resource domain is the collection of network elements, cables, etc. that is under control of a service provider. More specifically, a resource domain is a collection of network equipment owned by an Element Owner (EO). A resource domain is similar to an Autonomous System that is used in Internet-related standards, but an Autonomous System usually only refers to IP and MPLS equipment.

An EO is a service provider that offers services, such as data transport services or content distribution to other service providers. Examples of elements include a transport network, access to residential subscribers in an area, content servers, caching devices, billing systems and authentication systems.

An administrative owner (AO) is a service provider who does end-to-end service composition. An AO is a role that any participating service provider can take. For example, when a service provider wants to offer a service to the service provider's residential or enterprise customers for whom the service provider needs to subcontract service from other service providers, the service provider becomes the AO which buys elements from the EOs. Thus, the AO is able to offer service to end customers.

EOs advertise service through element templates, which is a standardized data structure. With respect to data transport services, an element template specifies adjacencies and the protocols carried over those adjacencies. By comparing element templates, an Administrative owner (AO) can select which templates work best to provide an end-to-end transmission.

FIG. 1 illustrates a system including multiple resource domains and EOs. A system 100 may include resource domains 110, 120 and 130. The system 100 may be the Internet, for example.

As shown, each of the resource domains 110, 120 and 130 are coupled to each other. Each of the resource domains 110, 120 and 130 includes elements (not shown) which are owned by EOs 115, 125 and 135, respectively. As described above, each of the EOs 115, 125 and 135 is also a service provider that owns the resource domains 110, 120 and 130, respectively.

Each of the EOs 115, 125 and 135 publish an element template regarding the adjacencies and protocols carried over those adjacencies for each the EOs 115, 125 and 135 respective elements. An AO 150 receives the published element templates. The AO 150 may be any one of the service providers that owns the resource domains 110, 120 and 130. Based on the element templates, the AO 150 decides a path 170 for end-to-end connectivity.

FIG. 2 illustrates a Multiprotocol Label Switching (MPLS)/Ethernet interface between two resource domains.

As shown in FIG. 2, an MPLS/Ethernet interface 200 exists between a first resource domain 220 and a second resource domain 260. The first resource domain 220 includes an MPLS switch 240 and the second resource domain 260 includes an MPLS switch 280. The Ethernet layer is terminated in the MPLS switches 240 and 280. Therefore, the MPLS/Ethernet interface 200 cannot be used to carry end-to-end Ethernet traffic, since the MPLS switches 240 and 280 do not switch Ethernet packets.

FIG. 3 illustrates another MPLS/Ethernet interface between two resource domains. As shown in FIG. 3, an MPLS/Ethernet interface 300 exists between a first resource domain 320 and a second resource domain 360. The first resource domain 320 includes an Ethernet switch 325 connected to MPLS switches 330 and 335. Similarly, the second resource domain 360 includes an Ethernet switch 365 connected to MPLS switches 370 and 375. As shown, Ethernet traffic will be switched through the Ethernet switches 325 and 365, but will be terminated in the MPLS switches 330, 335, 370 and 375. Therefore, the MPLS/Ethernet interface 300 cannot be used to carry end-to-end Ethernet traffic.

Consequently, publishing adjacency information that identifies the transmission protocol on the inter-carrier interface is not sufficient to successfully advertise what kind of data transport service can be supported through a resource domain.

SUMMARY

Example embodiments are directed to a method of publishing an element template from a first service provider to an administrative owner. The method includes determining, at the first service provider, adjacencies between a first resource domain of the first service provider and a second resource domain of a second service provider. The first service provider publishes to an administrative owner, an element template that identifies connectivity attributes, including adjacencies and adaptation capabilities of the first resource domain. The adjacencies indicate the existence of at least one inter-carrier interface between the first and second resource domains. The adaptation capabilities indicate the existence of at least one adaptation function within the first resource domain.

Example embodiments also provide a method of receiving an element template at an administrative owner from a first service provider that owns a first resource domain. The method includes receiving the element template from the first service provider. The element template identifies connectivity attributes, including adjacencies and adaptation capabilities of the first resource domain. The adjacencies indicate the existence of at least one inter-carrier interface between the first resource domain and a second resource domain of a second service provider. The adaptation capabilities indicate the existence of at least one adaptation function within the first resource domain.

Example embodiments also provide a method of determining an optimal end-to-end data transport path across resource domains for data transport, each of the of resource domains being owned by a associated service provider. The method includes determining, by an administrative owner, source and destination end-points and a desired transmission protocol. The administrative owner receives an element template from each of the service providers. The element template identifies connectivity attributes including adjacencies and adaptation capabilities of the resource domain owned by the associated service provider. The adjacencies indicate the existence of at least one inter-carrier interface between the resource domain owned by the associated service provider and another of the resource domains. The adaptation capabilities indicate the existence of at least one adaptation function within the resource domain owned by the associated service provider, and the adaptation function is an ability of the resource domain owned by the associated service provider to receive a first transmission protocol and map the first transmission protocol onto a second transmission protocol. A plurality of possible paths is developed based on the element templates and an optimal path is selected from the plurality of possible paths between.

BRIEF DESCRIPTION OF THE DRAWINGS

Example embodiments will be more clearly understood from the following detailed description taken in conjunction with the accompanying drawings. FIGS. 1-9C represent non-limiting, example embodiments as described herein.

FIG. 1 illustrates a system including multiple resource domains and EOs;

FIG. 2 illustrates a conventional MPLS/Ethernet interface between two resource domains;

FIG. 3 illustrates another conventional MPLS/Ethernet interface between two resource domains;

FIG. 4 illustrates a system according to an example embodiment;

FIG. 5 illustrates an example embodiment of a system of resource domains once an adjacency or adjacencies are determined;

FIG. 6 illustrates a system according to an example embodiment;

FIG. 7 illustrates a high-level path selection according to an example embodiment;

FIG. 8 illustrates a low-level path selection in the plurality of resource domains shown in FIG. 7; and FIGS. 9A-9C illustrate a high-level path selection method according to an example embodiment.

DETAILED DESCRIPTION

Figure 1:
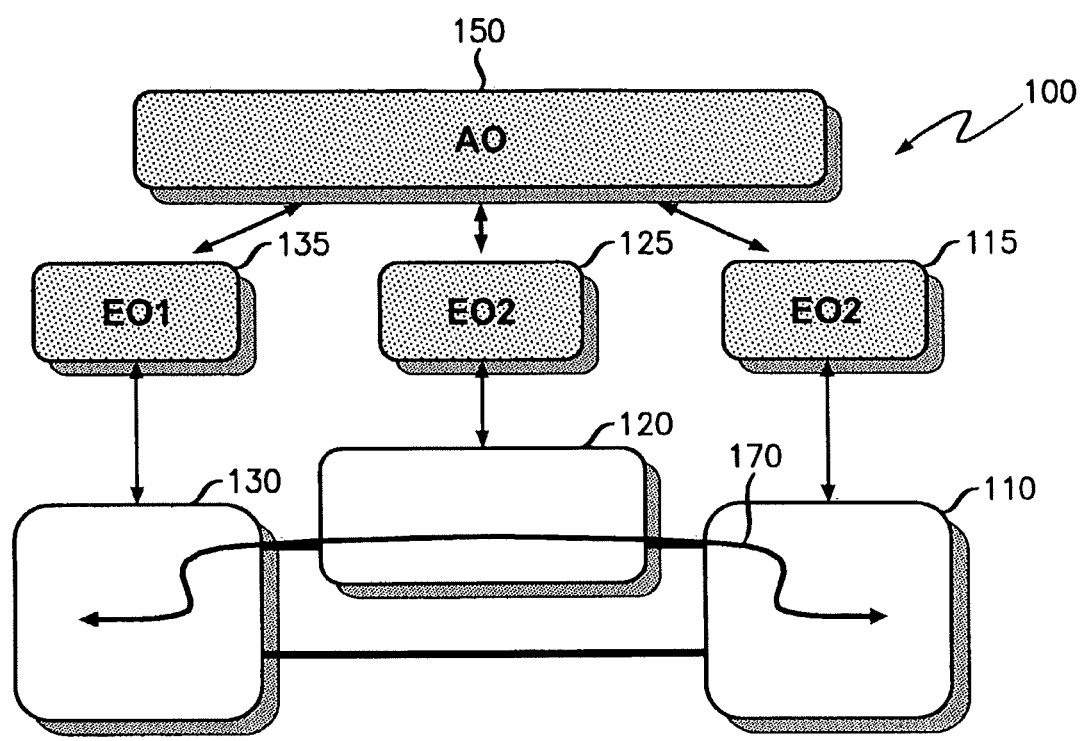
Figure 2:
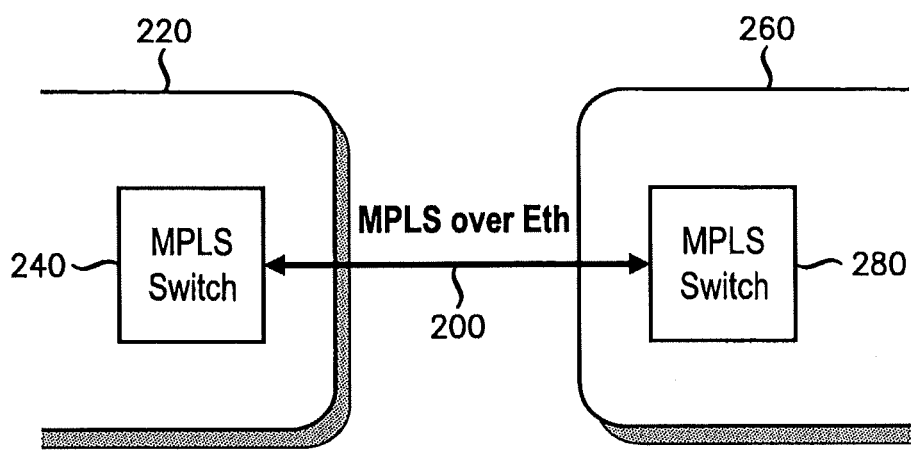
Figure 3:
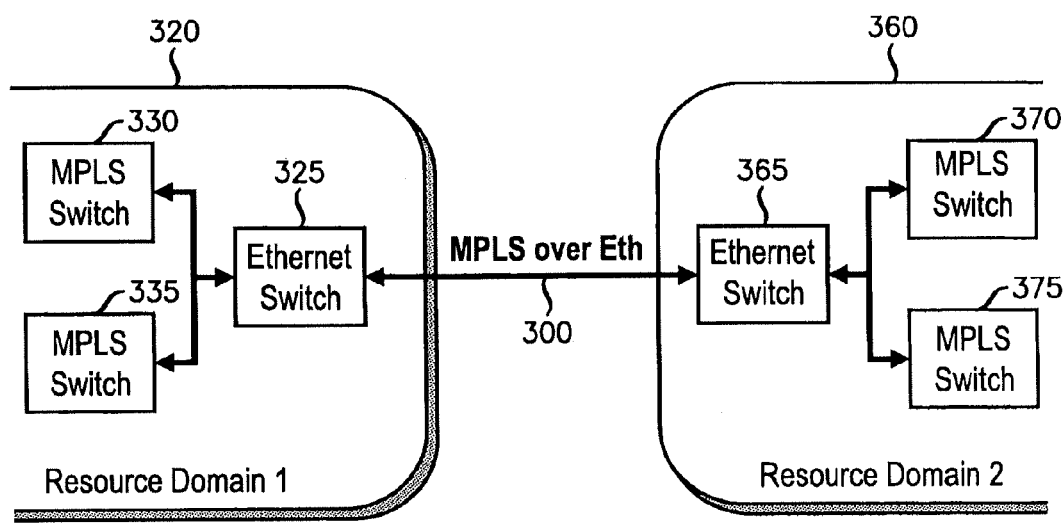

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/ acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Example embodiments are directed to end-to-end connectivity. End points, such as a source and destination, may be end users, video servers, session border controllers (SBCs), or any other type of network element.

Example embodiments are directed to a method that enables service providers to publish their capabilities and that enables a third party to establish an optimal end-to-end transport capability based on the capabilities published by the service providers. More specifically, information regarding the connectivity through a resource domain is published in an element template as the primary parameter as opposed to transmission protocol on the ICI.

To limit the amount of information exposed through element templates a set of ICIs with similar characteristics is represented as an adjacency.

Figure 4:
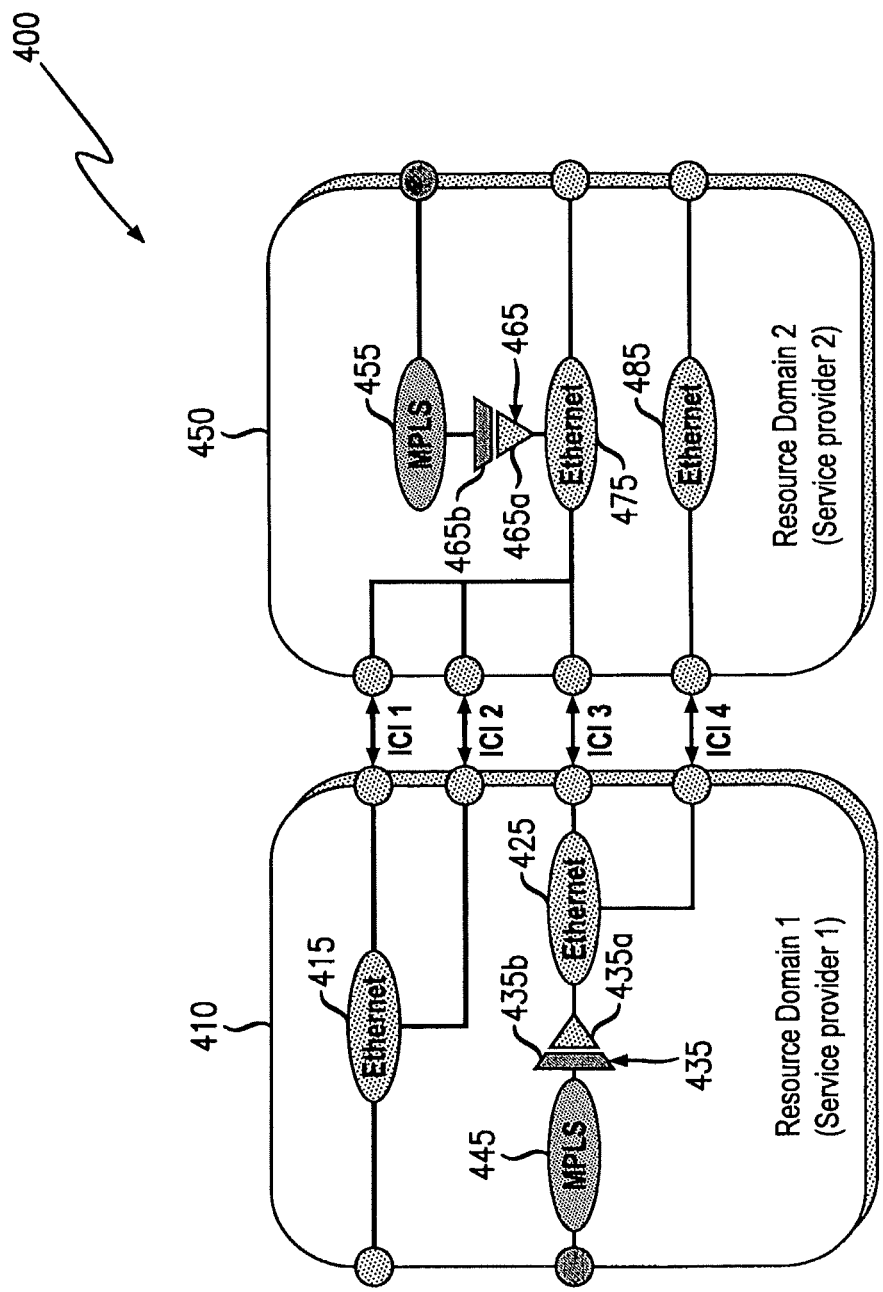

FIG. 4 illustrates a system according to an example embodiment. A system 400 includes resource domains 410 and 450, which are connected by ICIs ICI1, ICI2, ICI3 and ICI4. The system 400 may be the Internet, for example, but is not limited thereto. Furthermore, while only two resource domains 410 and 450 are illustrated, it should be understood the system 400 may include more than two resource domains.

The resource domain 410 is owned by a service provider and the resource domain 450 is owned by another service provider.

The resource domain 410 includes Ethernet sub-networks 415 and 425, an adaptation capability 435 and an MPLS sub-network 445. The adaptation capability 435 includes a trail termination 435a and an adaptation 435b. The Ethernet sub-network 415 receives and transmits data to the resource domain 450 through ICIs ICI1 and ICI2. The Ethernet sub-network 425 receives and transmits data to the resource domain 450 through ICIs ICI3 and ICI4.

The adaptation capability 435 represents a collection of one or more physical adaptation functions. Adaptation is a transport processing function that maps one protocol onto another, thereby allowing transport protocols to be carried over other transport protocols. For example, Ethernet can be carried over MPLS using pseudowire technology, as described in "Encapsulation Methods for Transport of Ethernet over MPLS Networks." *RFC* 4448, April 2006. As one of ordinary skill in the art would know, pseudowire technology is the technique of carrying non-IP traffic over MPLS or IP tunnels.

An adaptation function provides MPLS-to-Ethernet adaptation and maps MPLS traffic received over MPLS sub-network 445 onto Ethernet traffic transmitted over Ethernet sub-network 425. In the reverse direction, the adaptation function terminates the Ethernet trail of MPLS-over-Ethernet traffic received over Ethernet sub-network 425 and transmits native MPLS traffic over MPLS sub-network 445.

As stated above, the adaptation capability 435 represents a collection of one or more physical adaptation functions. The EO of the resource domain 410 publishes an element template identifying the adaptation capability 435. However, the number of adaptation functions within the resource domain 410 does not need to be included in the element template. Therefore, the amount of information that the EO of the resource domain 410 publishes is limited.

The trail termination 435a performs end point functionality with respect to a specific protocol, for example fault functionality. The trail termination 435a and the adaptation 435b are understood by one of ordinary skill in the art and are defined in "Generic Functional Architecture of Transport Networks." *Series G: Transmission Systems and Media, Digital Systems and Networks, ITU G*.805, March 2000. Thus, for the sake of clarity and brevity, the trail termination 435a and the adaptation 435b will not be described in greater detail.

The resource domain 450 includes Ethernet sub-networks 475 and 485, an adaptation capability 465 and an MPLS sub-network 455. The adaptation capability 465 includes a trail termination 465a and an adaptation 465b. The adaptation capability 465 represents a collection of one or more physical adaptation functions. The trail termination 465a and the adaptation 465b are the same as the trail termination 435a and the adaptation 435b, respectively. Therefore, the trail termination 465a and the adaptation 465b will not be described further. The Ethernet sub-network 475 receives and transmits data to the resource domain 410 through ICIs ICI1, ICI2 and ICI3. The Ethernet sub-network 485 receives and transmits data to the resource domain 410 through ICI ICI4.

As stated above, a set of ICIs with similar characteristics is represented as an adjacency. An adjacency is the collection of ICIs that can be treated as identical by any service provider who wishes to get data transport functionality through any of the ICIs. Therefore, the ICIs that are part of an adjacency are the ICIs that are considered part of one group from the service provider's perspective as well as from the other service provider's perspective. The following process is used to identify the adjacencies between the resource domain 410 and the resource domain 450.

Each of the service providers that own the resource domains 410 and 450, respectively, divides the ICIs between the first resource domain 410 and the second resource domain 450 into subsets that have the same connectivity attributes with respect to its resource domain. The connectivity attributes may include transmission protocols, adaptation functions and, if appropriate: commercial terms, such as price; service level agreement (SLA) parameters, such as delay; and regulatory constraints.

For example, the service provider that owns the resource domain 410 identifies subsets $A_1$-$A_n$ and the service provider that owns the resource domain 450 identifies subsets $B_1$-$B_m$ based on the connectivity attributes. For example, if the service provider who owns the resource domain 410 asks a higher price for connectivity through the ICI ICI1 than for connectivity through the ICI ICI2, the ICIs ICI1 and ICI2 are not part of the same adjacency.

The set of adjacencies between A and B is then defined as the set of subsets $C_k$ that are intersections of an $A_i$ subset and a $B_j$ subset: $C_k$ is a set of ICIs for which $\exists i_{\in\{1,\ldots,n\}} \exists j_{\in\{1,\ldots,m\}} [C_k = A_i \cap B_j]$. Therefore, $C_k$ is the representation of ICI subsets that are considered part of the same group by the service provider for the resource domain 410 and that are considered part of the same group by the service provider for the resource domain 450.

The service providers then assign globally unique identifiers to each adjacency. The service providers use the globally unique identifiers in the element templates that are published by the service providers.

For example, in FIG. 4, if ICIs ICI1 and ICI2 share the same connectivity attributes, then ICIs ICI1 and ICI2 form an adjacency between the resource domain 410 and the resource domain 450.

Figure 5:
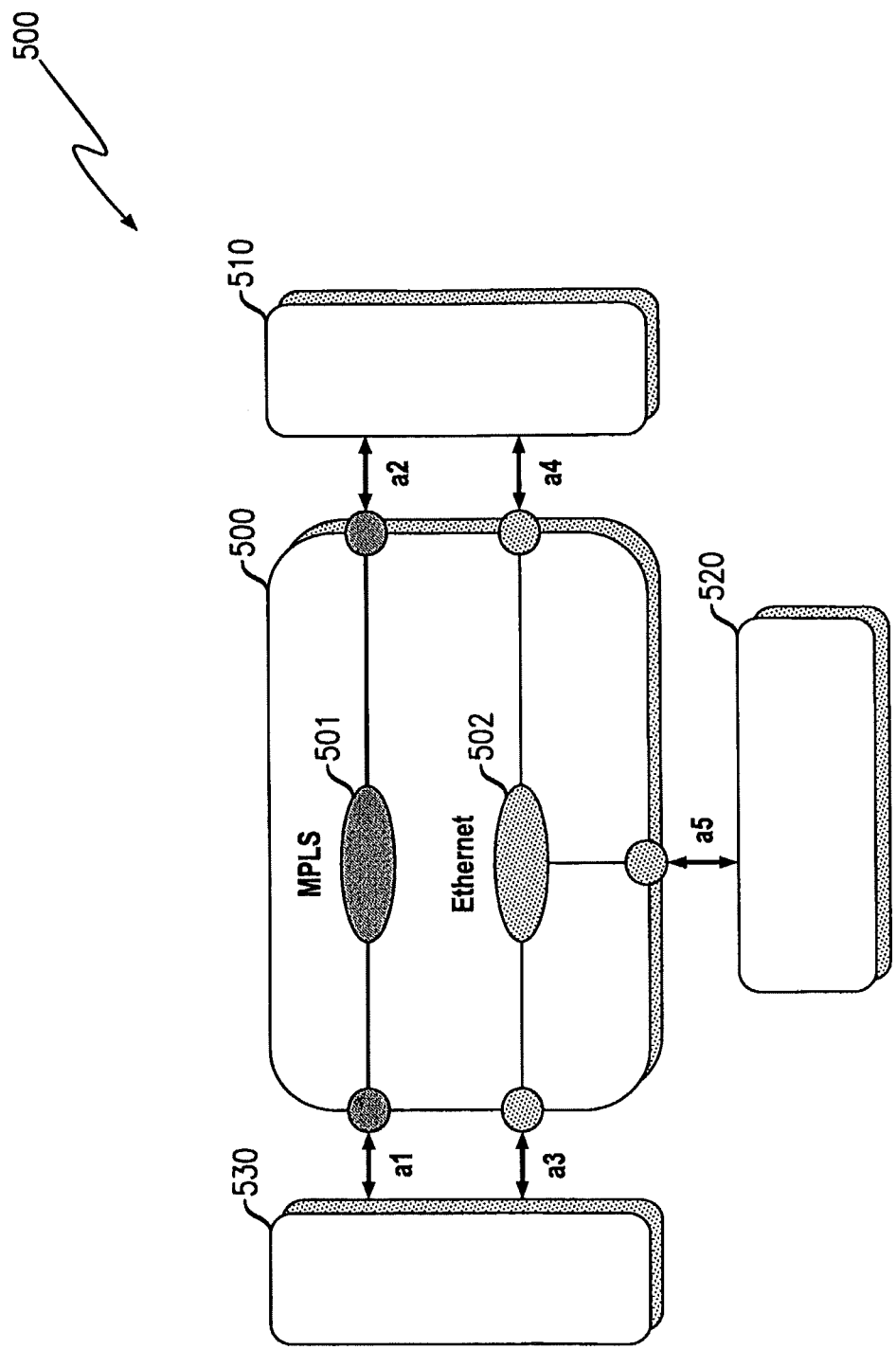

FIG. 5 illustrates an example embodiment of a system of resource domains once an adjacency or adjacencies are determined. A resource domain 500 includes an MPLS sub-network 501 and an Ethernet sub-network 502. Therefore, the resource domain 500 provides both MPLS and Ethernet connectivity.

The resource domain 500 is coupled to a resource domain 510 by adjacencies a2 and a4. Furthermore, the resource domain 500 is coupled to a resource domain 530 by adjacencies a1 and a3 and is coupled to a resource domain 520 by adjacency a5. As shown, the resource domain 500 may provide MPLS connectivity between the resource domains 510 and 530. Furthermore, the resource domain 500 may provide Ethernet connectivity between resource domains 510 and 520, between resource domains 520 and 530 and between resource domains 510 and 530.

Figure 6:
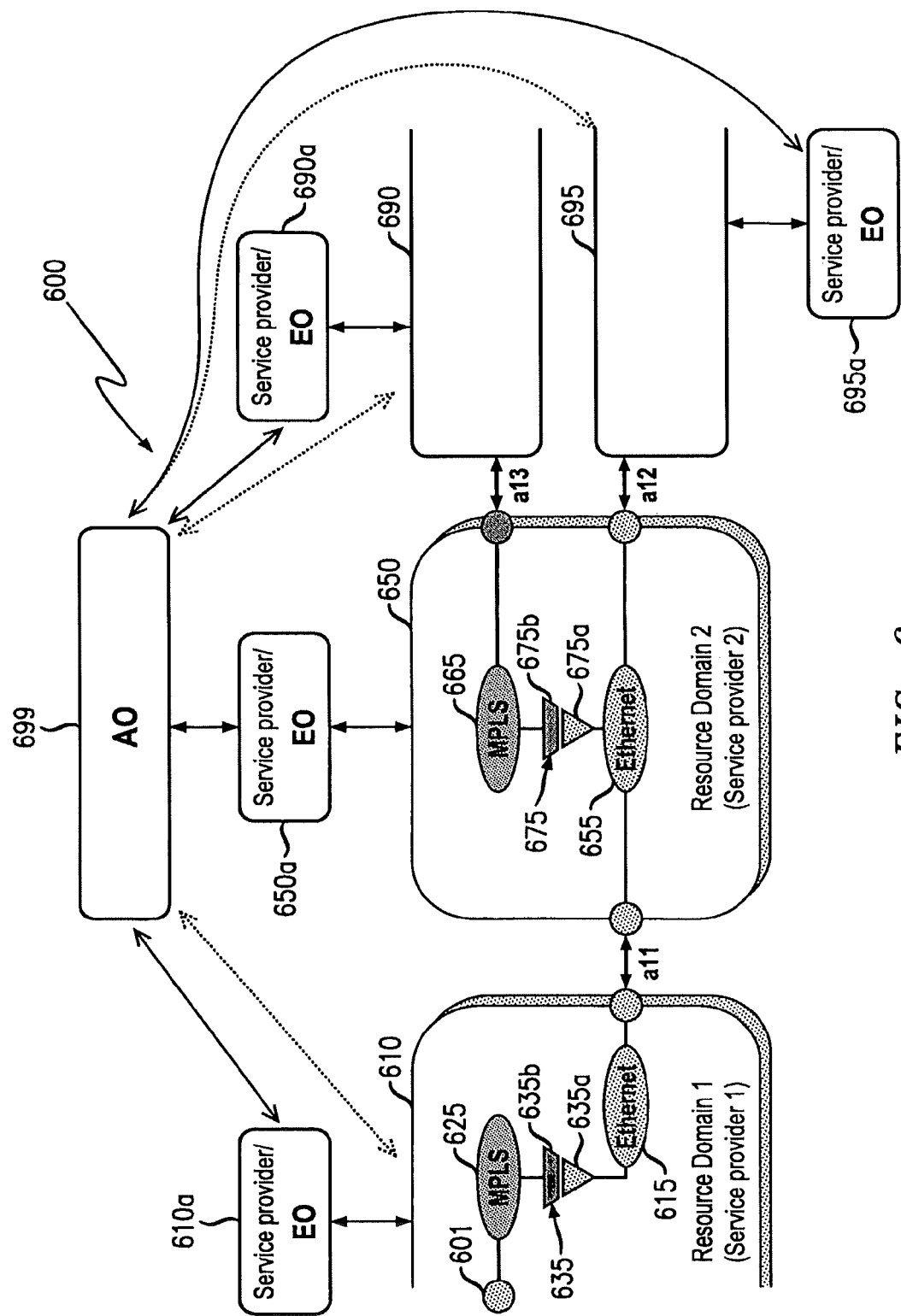

FIG. 6 illustrates a system according to an example embodiment. A system 600 includes resource domains 610, 650, 690 and 695. Similar to the systems previously described, the system 600 may be the Internet, but should not be limited thereto.

As shown, an adjacency a11 connects a resource domain 610 and a resource domain 650. Furthermore, an adjacency a12 connects the resource domain 650 to the resource domain 695 and an adjacency a13 connects the resource domain 650 to the resource domain 690. Adjacencies a11 and a12 may be Ethernet adjacencies, whereas the adjacency a13 may be an MPLS adjacency. The adjacencies a11, a12 and a13 are determined as described above.

The resource domains 610, 650, 690 and 695 are owned by service providers 610a, 650a, 690a and 695a, respectively. Furthermore, while FIG. 6 illustrates the resource domains 610, 650, 690 and 695, it should be understood that the system 600 may include any number of resource domains.

The first resource domain 610 includes an Ethernet sub-network 615 coupled to an MPLS sub-network 625 via an adaptation capability 635. The adaptation capability 635 includes a trail termination 635a and an adaptation 635b.

The adaptation capability 635 maps the MPLS protocol onto the Ethernet protocol so data can be transferred from the MPLS sub-network 625 over the Ethernet sub-network 615 and eventually carried as Ethernet traffic across the resource domain 650. In the reverse direction, MPLS-over-Ethernet traffic received over the MPLS sub-network 615 is processed in the adaptation capability 635. The Ethernet trail is terminated and the MPLS traffic is forwarded over the MPLS sub-network 625 towards an end source 601.

The adaptation capability 675 includes a trail termination 675a and an adaptation 675b. The adaptation capability 675 performs a same function as the adaptation capability 635 and, therefore, will not be discussed in more detail.

The resource domain 650 may provide data over an MPLS protocol to the resource domain 690 because the adaptation capability 675 is connected between the Ethernet sub-network 655 and the MPLS sub-network 665. Additionally, the resource domain 650 may provide data to the resource domain 695 over the Ethernet protocol.

When one of the service providers 610a, 650a, 690a or 695a offers transit functionality to the other service providers, that service provider publishes an element template.

Generally, every service provider who is a member of the system receives element templates. For example, in FIG. 6, the service providers 610a, 650a, 690a and 695a and an AO 699 receive element templates. The AO 699 could be a different service provider than the service providers 610a, 650a, 690a and 695a. However, it is possible for a service provider to publish an element template only to a subset of the service providers in the system. Each of the service providers 610a, 650a, 690a and 695a may publish an element template periodically, when an associated element is updated, when a malfunction in one of an associated resource domain 610, 650, 690 or 695 occurs, and when the service provider 610a, 650a, 690a, or 695a receives a request to publish the element template from the AO 699.

Each of the service providers 610a, 650a, 690a and 695a publishes in its element templates the connectivity options the service provider 610a, 650a, 690a or 695a offers between identified adjacencies. If an adaptation capability is provided to connect one adjacency with another, the element template identifies the adaptation capability in the element templates for their respective elements. The identification of adaption capabilities includes identification of client and server layer protocols, e.g., MPLS-to-Ethernet.

The element template identifies connectivity options across the associated resource domain. The element template identifies the pairs of adjacencies between which the service provider provides connectivity with the associated connectivity attributes. As stated above, the connectivity attributes may include transmission protocols, including adaptation functions, if appropriate; commercial terms, such as price; service level agreement parameters, such as delay; and regulatory constraints.

For example, in the example illustrated in FIG. 6, the service provider 650a could publish the following connections in the service provider's 650a element template:

1. a11-a12:
Transmission protocol: Ethernet
Commercial terms
Regulatory constraints
SLA-related parameters
2. a11-a13:
Transmission protocol: Ethernet-Adaptation (MPLS-to-Ethernet)-MPLS
Commercial terms
Regulatory constraints
SLA-related parameters
3. a12-a13:
Transmission protocol: Ethernet-Adaptation (MPLS-to-Ethernet)-MPLS
Commercial terms
Regulatory constraints
SLA-related parameters It should also be noted that a geographical parameter could be used as an SLA-related parameter in addition to or instead of a time delay. Therefore, when the AO 699 initiates a high-level path selection process (as will be described later), the AO 699 could identify regions that should be excluded. This simplifies the path selection algorithm and results in a selected path that is not subject to an excessive propagation delay.

As shown in FIG. 6, the AO 699 communicates with, and therefore, may receive published elements from, the service providers 610a, 650a, 690a and 695a. Therefore, the AO 699 receives information indicating that the first resource domain 610 cannot be used as a transit network for native Ethernet traffic and that the second resource domain 650 can fulfill two roles with respect to MPLS-over-Ethernet traffic. The AO 699 may receive may an element template periodically, when an associated element is updated, when a malfunction in one of the resource domains 610, 650, 690 or 695 occurs. Furthermore, the AO 699 may issue a request for an element template to at least one of the service providers 610a, 650a, 690a and 695a and receive an element template from at least one of the service providers 610a, 650a, 690a, or 695a that responds to the request.

First, the second resource domain 650 can terminate the Ethernet trail and forward native MPLS traffic through the MPLS sub-network 665. Second, the second resource domain 650 may act as a transit domain for native Ethernet traffic in which case a third service provider needs to provide an adaptation function to terminate Ethernet traffic and retrieve native MPLS traffic.

Based on the received element templates identifying the adaptation capabilities, the AO 699 knows that the resource domain 610 and the resource domain 650 both include adaptation functions. The received information enables the AO 699 to select an end-to-end path.

To select an end-to-end path, an AO uses a two step process. The first step includes selecting resource domains including a selection of adjacencies and adaptation capabilities. The second step includes selecting a path inside the selected resource domains and ICIs.

The first step is a high-level path selection. For each connection, the associated attributes are published in the element template. Based on the connections and associated attributes in the element templates published by the service providers in a system, an AO selects the resource domains to use for transmitting data as the high-level path selection. For example, an AO may select a path based on the transmission protocol and cost. The high-level path selection of resource domains includes selecting adjacencies and adaptation functions.

Figure 7:
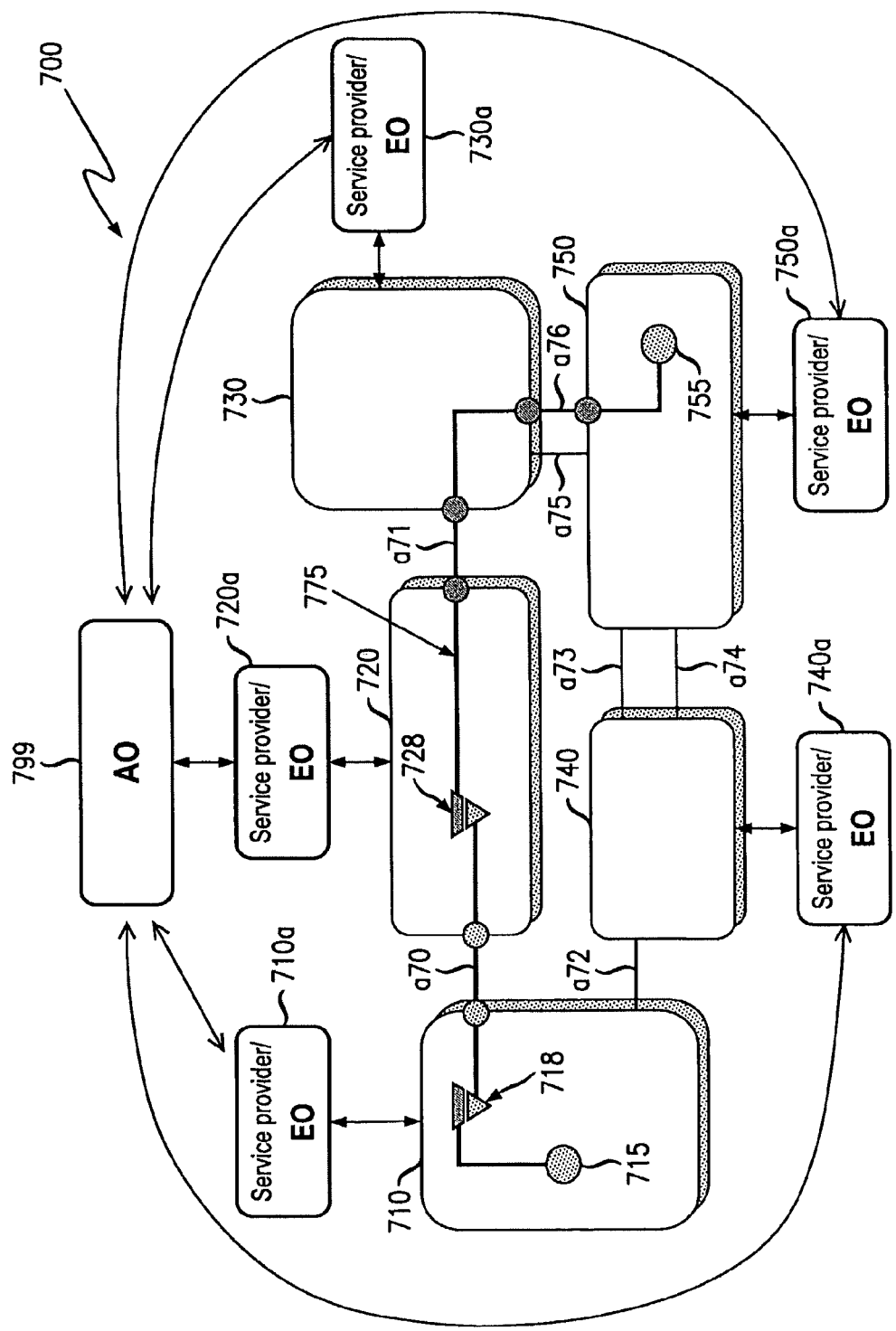

An example embodiment of a high-level path selection is shown in FIG. 7. As shown, a system 700 includes resource domains 710, 720, 730, 740 and 750. The system 700 may be the Internet, but is not limited thereto. Furthermore, the system 700 may include more than five resource domains.

An adjacency a70 couples the resource domain 710 with the resource domain 720. An adjacency a71 couples the resource domain 720 with the resource domain 730. An adjacency a72 couples the resource domain 710 with the resource domain 740. Furthermore, two adjacencies a73 and a74 are between the resource domain 740 and the resource domain 750. Similarly, two adjacencies a75 and a76 are between the resource domain 730 and the resource domain 750.

As illustrated in FIG. 7, the first resource domain 710 includes a source 715 and the resource domain 750 includes a destination 755. However, it should be understood that the directionality (i.e., the source 715 to the destination 755) is an example and the example embodiments provided throughout disclosure may be applied in either direction as well as bi-directional.

To transmit data from the source 715 to the destination 755, the AO selects a path 775 based on published element templates from the resource domains 710, 720, 730, 740 and 750.

The adjacencies, adaptation capabilities, cost and other connectivity attributes that are identified in the element templates may be used by an AO 799 to select the path 775 between the source 715 and the destination 755.

Furthermore, the resource domain 710 includes an adaptation capability 718 and the resource domain 720 includes an adaptation capability 728. As an example, the path 775 illustrates MPLS being carried over Ethernet between the resource domains 710 and 720 and as native MPLS traffic between the resource domains 720 and 750. The AO 799 selects adjacency a76 between the resource domain 730 and the resource domain 750.

Once the AO 799 selects the path 775, which includes the selection of adjacencies a70, a71 and a76 and adaptation capabilities 718 and 728, the AO 779 triggers the selected EOs, i.e., the service providers 710a, 720a, 730a and 750a.

Each of the service providers 710a, 720a, 730a and 750a selects a path inside the associated selected resource domain 710, 720, 730 and 750 and ICIs between the selected resource domains 710, 720, 730 and 750. Thus, the AO 799 is able to select the adjacencies a70, a71 and a76, but the selection of the ICIs is up to the service providers 710, 720a and 730a and 750a. This process, the second step, may be referred to as a low-level path selection.

Figure 8:
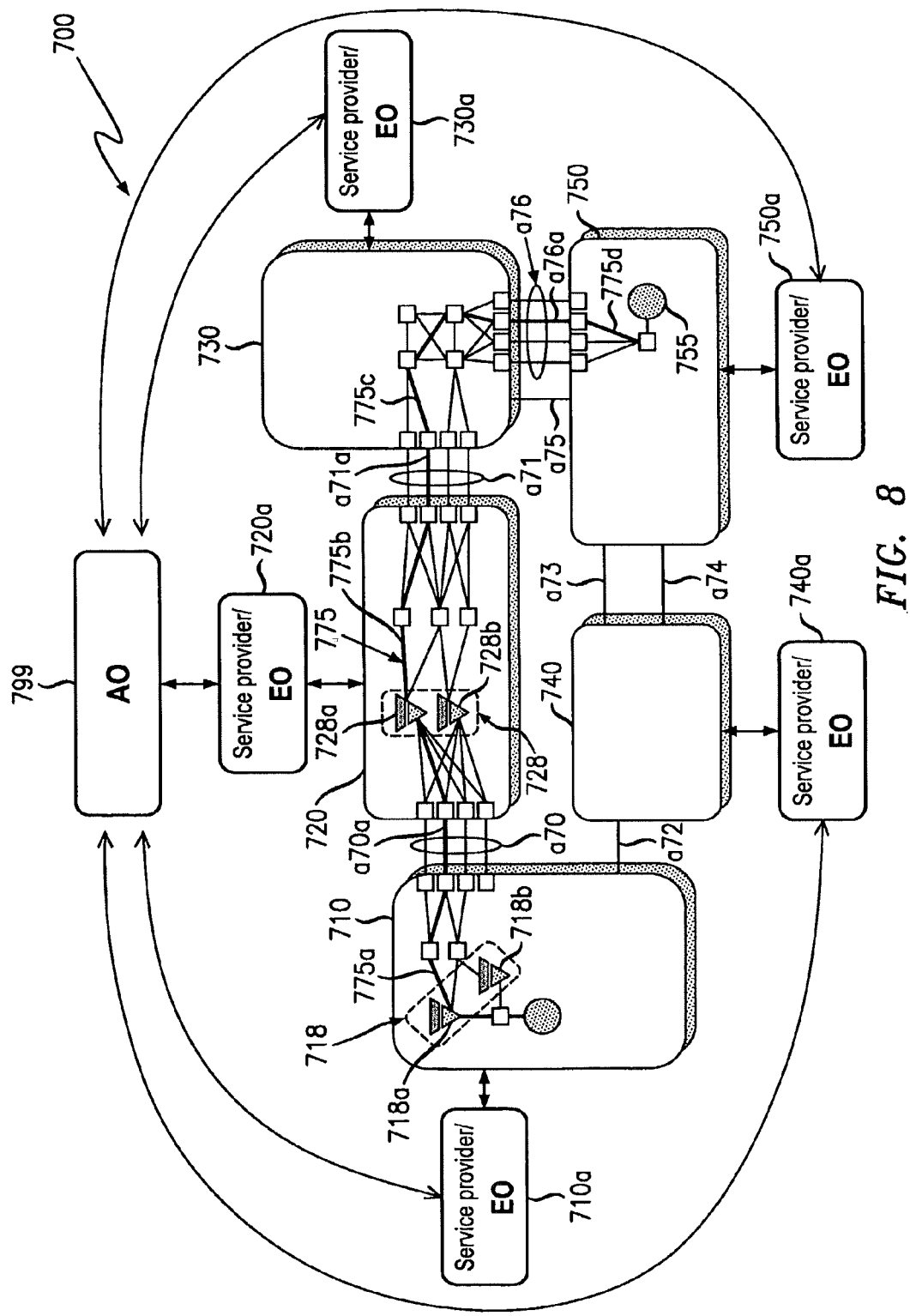

FIG. 8 illustrates a low-level path selection in the autonomous system shown in FIG. 7. The low-level path selection is used to select ICIs within the selected adjacencies a70, a71 and a76. Furthermore, routes within each of the selected resource domains 710, 720, 730 and 750 are selected to form the path 775.

As shown in FIG. 8, the adaptation capability 718 in the first resource domain 710 provided in the high-level selection includes two adaptation functions 718a and 718b. The service provider 710a selects which adaptation function 718a or 718b is used based on the service provider's 710a as a matter of design choice. Therefore, the AO 799 does not see the adaptation functions 718a and 718b, unless the AO 799 is the owner of that resource domain, but only sees the adaptation capability 718. The adaptation capability 718 appears as a single adaptation function to the AO 799.

In the example of FIG. 8, the AO 799 decides to select the end-to-end path 775 that includes the adaptation capability 718. The decision to use the adaptation function 718a or the adaptation function 718b is up to the service provider that owns the first resource domain 710, the service provider 710a.

A same process is used by the service provider 720a that owns the resource domain 720 to select one of adaptation functions 728a and 728b of adaptation capability 728. Therefore, for the sake of clarity and brevity, the process will not be described in further detail. As shown, the adaptation function 728a is selected as an example in FIG. 8.

The service provider 710a that owns the resource domain 710 selects a path 775a within the first resource domain 710 to transmit the data. An algorithm used to select the path 775a is selected by the 710a after the service provider 710a and the service provider 720 (the neighboring service provider of the service provider 710a) agree on an ICI a70a.

A same process is used by the service providers 720a, 730a and 750a to select paths 775b, 775c and 775d, respectively. Therefore, for the sake of clarity and brevity, the path selection process will not be further described.

As shown in FIG. 8, each of the selected adjacencies a70, a71 and a76 includes four ICIs. However, it should be understood that each of the selected adjacencies a70, a71 and a76 may include any number of ICIs equal to or greater than 1. The selection of an ICI is made by the two service providers who own the resource domains that are coupled by the ICI. The process used to select an ICI is decided by the resource domains that are coupled by the ICI. For example, the service providers 710a and 720a select an ICI a70a. A same process is used to select ICIs a71a and a76a, therefore the process will not be described in further detail. The process used by neighboring service providers is determined by the service providers. The selection of an ICI is not visible to any of the other service providers in the system 700.

For example, the service provider 710a the service provider 720a select the ICI a60a. The selection of the ICI a60a is not known by the service providers 730a, 740a and 750a, nor to the AO 799. Therefore, the amount of information that one service provider exposes to the other service providers is minimized.

Based on the selected paths 775a, 775b, 775c and 775d, data can be transmitted from the source 715 to the destination 755.

Since adaptation capability is treated as an integral part of connectivity between adjacencies, a straightforward high-level path selection process is realized that evaluates all possible paths (those that include adaptation capabilities and those that don't) and that selects the optimal high-level path based on the attributes identified by the AO.

Figure 9A:
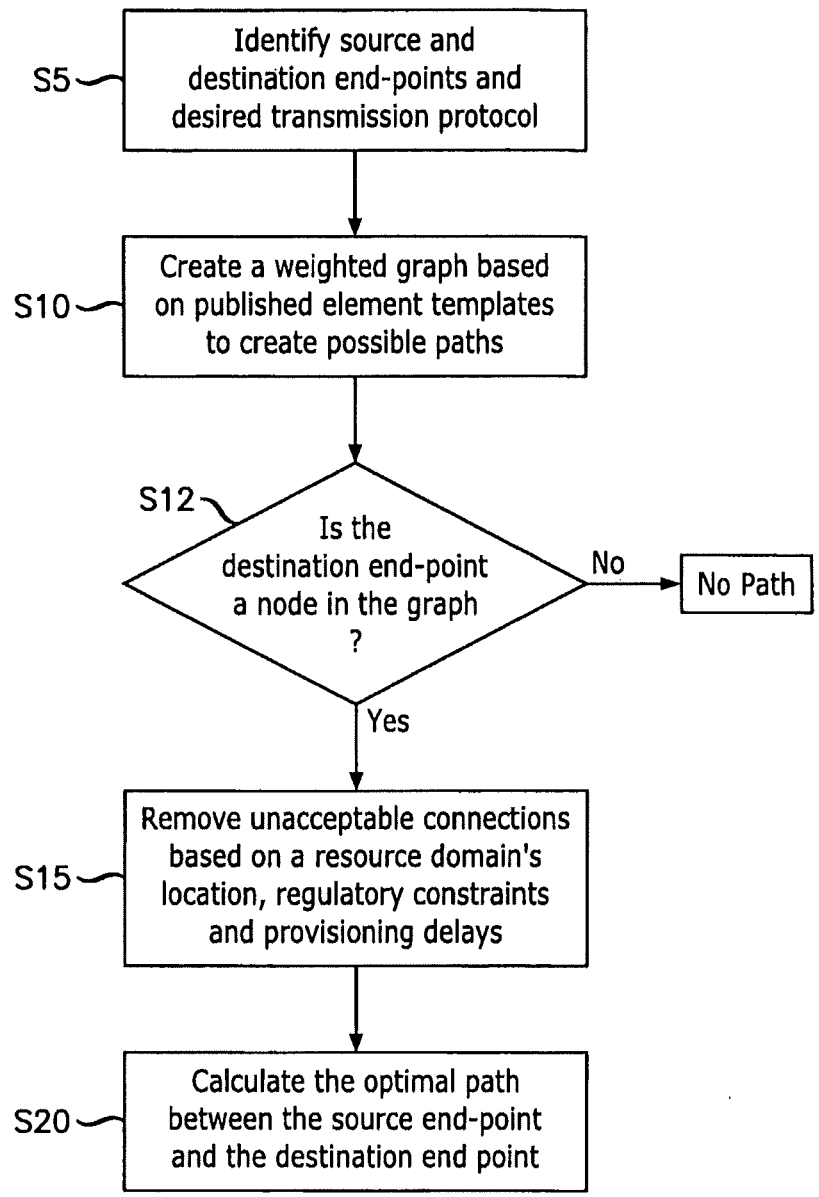
Figure 9B:
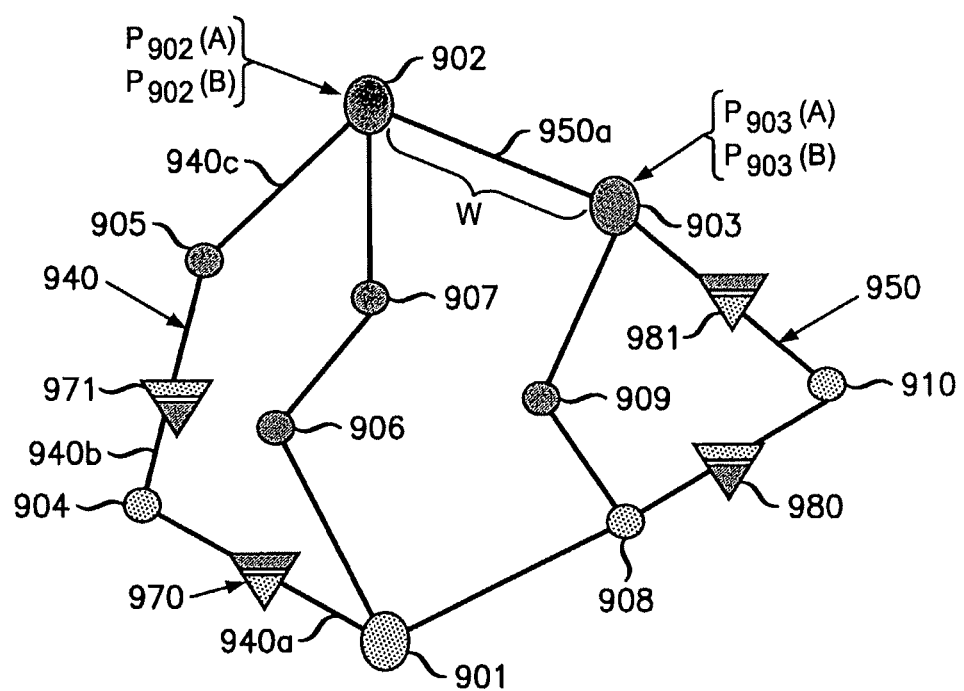
Figure 9C:
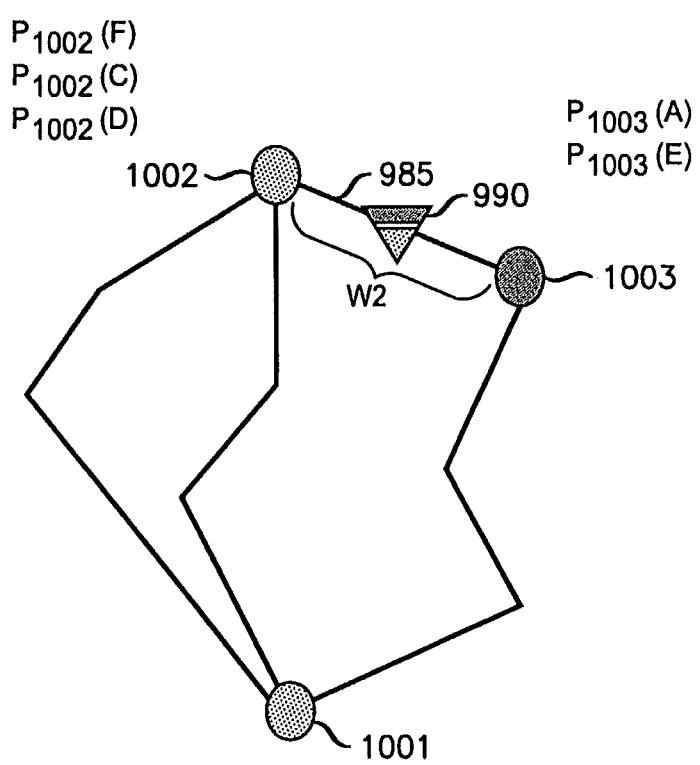

A method utilizing the example embodiments is illustrated in FIGS. 9A-9C. FIG. 9A illustrates a flow chart that is used in conjunction with the weighted graphs shown in FIG. 9B and 9C. In the following method, published element templates may include transmission protocol, including adaptation capabilities, commercial terms, regulatory constraints, geographical location and provisioning delay.

As shown in FIG. 9A, an AO identifies a source end-point and a destination end-point and a desired transmission protocol for transmission at S5. The desired transmission protocol is determined by the selection of end-points. For example, in FIG. 9B, an AO in a system selects a node 901 as a source end-point and a node 902 as a destination end-point. If multiple transmission protocols are accepted between the two end-points, the path selection algorithm should be executed once for each possible protocol, and based on a comparison of outcomes, the optimal high-level path can be determined.

In the example illustrated in FIG. 9B, the node 902 is a first transmission protocol node. Therefore, the lowest level in the protocol stack must be the first transmission protocol.

Once the source and destination end-points and the desired transmission protocol have been identified, the AO creates a weighted graph based on the published element templates the AO receives from the service providers associated with the adjacencies and end-points at S10. An example of a weighted graph is illustrated in FIG. 9B.

As shown in FIG. 9B, nodes 901-910 represent end-points and adjacencies. Connections between the end-points and adjacencies are represented by edges.

When the AO creates the graph, the AO starts with the published element template of the source end-point 901. The published element template of the source end-point 901 identifies one or more adjacencies to which the end-point is connected. Using FIG. 9B as an example, the published element template of the source end-point 901 would include adjacencies 904, 906 and 908.

Subsequently, all of the published element templates, including the published element template of the destination end-point are inspected to create the graph. The inspection of the published element templates continues until all of the published element templates have been incorporated, or until the remaining published element templates do not have any adjacencies in the graph.

At S12, the AO verifies whether the destination end-point is a node in the graph. If the destination end-point is not a node, then the AO determines that there is not a path from the source end-point to the destination end-point based on the published element templates.

If the node 902 is a node in the graph, then the AO removes unacceptable connections in the graph at S15. The unacceptable connections are determined by the AO based on several connection attributes, such as location, regulatory constraints and provisioning delay. The AO may decide to eliminate the unacceptable connections.

For example, the AO may not accept a path that goes through certain geographical locations to minimize end-to-end delay. Furthermore, the AO may not accept connections that require more than a day to be provisioned. The connections that are not acceptable to the AO are removed from the graph. It should be understood that step S15 may be combined with step S10 so that the unacceptable connections are not added to the graph.

Once the unacceptable connections are removed from the graph, the AO calculates the optimal path between the source end-point and the destination end-point at S20.

To calculate the optimal path, N is the number of nodes in the graph. For example, N equals 10 in the example shown in FIG. 9B. To determine the optimal path, an evaluation procedure is repeated N-1 times. Each iteration of the evaluation procedure includes an evaluation of every edge in the graph.

The weight associated with each edge in the graph is the cost of the connection as specified in the associated element template. For example, the cost of the connection may be the price. However, the graph may be used with other weights such as delay.

In the method, the multiple cost values are stored for all the nodes. Each cost value represents the cumulative weight of the minimum-cost path of length i or less from the source end-point to that node. Except for the source, the cost values at all nodes are initialized at ∞. When a cost is undefined, a path does not exist. Therefore, the cost is ∞. The cost of the source end-point is initialized at zero.

After i (e.g., N-1) iterations, the evaluation procedure results in the identification of the shortest path of length i or less to each node. However, since certain connections contain adaptation capabilities, multiple protocol stacks may apply to a certain adjacency (node). For each protocol stack, the minimum-cost path of length i must be recorded.

For example, the graph illustrated in FIG. 9B includes adaptation capabilities 970, 971, 980 and 981. A path 940, from the node 901 to the node 902 includes edges 940a, 940b and 940c. Traffic transmitted from the source end-point 901 is first adapted in a first transmission protocol-to-second transmission protocol adaptation capability 970 and subsequently in a second transmission protocol-to-first transmission protocol in adaptation capability 971. Traffic transmitted through the path 940 would appear in the node 902 as a first transmission protocol-over-second transmission protocol-over-first transmission protocol.

Therefore, the AO records both a minimum cumulative cost $P_{902}(A)$ for native first transmission protocol traffic as well as a minimum cumulative cost $P_{902}(B)$ for first transmission protocol-over-second transmission protocol-over-first transmission protocol traffic. In the example shown in FIG. 9B, $P_{902}(\ )$ indicates the cumulative weight (cost), A denotes a native first transmission protocol stack and B denotes a first transmission protocol-over-second transmission protocol-over-first transmission protocol stack.

Furthermore, traffic sent via a path 950 appears in the node 903 as a first transmission protocol-over-second transmission protocol-over-first transmission protocol stack. Like the node 902, the node 903 is a first transmission protocol node. Therefore, the lowest level in the protocol stack must be the first transmission protocol. The AO records as cost values for the node 903, both a minimum cumulative cost $P_{903}(A)$ for native first transmission protocol traffic as well as a minimum cumulative cost $P_{903}(B)$ for first transmission protocol-over-second transmission protocol-over-first transmission protocol traffic.

Traffic transmitted from the source end-point 901 is adapted in a first transmission protocol-to-second transmission protocol adaptation capability 980 and subsequently in a second transmission protocol-to-first transmission protocol in adaptation capability 981.

An edge 950a of the path 950 connects the node 903 to the node 902. A weight of the edge 950a is identified in FIG. 9B as w.

The cost values shown in FIG. 9B represent the minimum-cost paths of length 3 or less. In a fourth iteration, each edge in the graph is evaluated to determine whether there is a path of length 4 that results in a lower cumulative cost. In the evaluation procedure of the edge 950a, to determine whether the path 940 or the path 950 is optimal, each protocol stack must be evaluated separately. The protocol stacks are evaluated as follows:

1. If $P_{902}(A) > P_{903}(A)+w$, then update $P_{902}(A)$
2. If $P_{903}(A) > P_{902}(A)+w$, then update $P_{903}(A)$
3. If $P_{902}(B) > P_{903}(B)+w$, then update $P_{902}(B)$
4. If $P_{903}(B) > P_{902}(B)+w$, then update $P_{903}(B)$ For example if $P_{902}(A) > P_{903}(A)+w$, then $P_{903}(A)+w$ is assigned the new minimum cost value of $P_{902}(A)$ and the node 903 is recorded as the predecessor of the node 902 on the minimum-cost path.

FIG. 9C illustrates a case where an adaptation capability is located on an edge that is under evaluation. In this example, a node 1002 is a second transmission protocol node. Therefore, the lowest level in the protocol stack must be the second transmission protocol. A node 1003 is a first transmission protocol node. A node 1001 is connected to both the nodes 1002 and 1003.

FIG. 9C shows the nodes 1002 and 1003 connected via an edge 985. The connection includes a first transmission protocol-to-second transmission protocol adaptation capability 990. This means that first transmission protocol traffic from the node 1003 to the node 1002 arrives at the node 1002 as first transmission protocol-over-second transmission protocol traffic. The weight of the edge 985 is designated as w2.

The following evaluations are performed with respect to the node 1002:

1. If $P_{1002}(C) > P_{1003}(A)+w$, then update $P_{1002}(C)$
2. If $P_{1002}(D) > P_{1003}(E)+w$, then update $P_{1002}(D)$, wherein C is a first transmission protocol-over-second transmission protocol stack, A is the first transmission protocol stack, D is a second transmission protocol-over-first transmission protocol-over-second transmission protocol stack and E is a second transmission protocol-over-first transmission protocol stack. Furthermore, F represents a native second transmission protocol stack, as shown in FIG. 9C.

The same applies to any other possible protocol stack of one or more protocols, X, i.e.:

1. If $P_{1002}(X$ over $C) > P_{1003}(X$ over $A)+w$, then update $P_{1002}(X$ over $C)$ The following evaluations are performed with respect to the node 1003:

1. If $P_{1003}(A) > P_{1002}(C)+w$, then update $P_{1003}(A)$
2. If $P_{1003}(E) > P_{1002}(D)+w$, then update $P_{1003}(E)$ After the evaluation procedure has been executed N-1 times for all edges in the graph, the weights stored for each node represent the minimum cumulative cost from the source for each possible protocol stack. Since the graph has N nodes, the longest possible path has a maximum length of N-1. Therefore, after N-1 iterations, all possible paths have been evaluated. The path with the minimum weight (i.e., cumulative cost) is selected as the optimal path to transmit traffic.

Since the destination end-point is in the graph, the high-level path selection yields the minimum cumulative cost from the source end-point to the destination end-point with the selected path. Furthermore, it should be noted that in an intermediate node, such as the node 903, the intermediate node may receive first transmission protocol-over-second transmission protocol-over-first transmission protocol traffic. However, the traffic should be stripped down to the native protocol in the destination node. Therefore, even if there is a first transmission protocol-over-second transmission protocol-over-first transmission protocol path to the destination node that has the lowest cost, the path is not an acceptable path for optimal path. The method also allows for a selected path to be constructed by backtracking from a destination to a source, since, for every node, the node's predecessor on the minimum-cost path is stored.

Since every edge on the minimum cost path is associated with an element template, the AO can thus identify the EOs with which the AO must communicate to request setup of the corresponding low-level path.

Example embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the invention.

What is claimed is:

1. A method of publishing an element template from a first service provider to an administrative owner, the method comprising:

determining, at the first service provider, adjacencies between a first resource domain of the first service provider and a second resource domain of a second service provider, the adjacencies indicating the existence of at least one inter-carrier interface between the first and second resource domains; and publishing from the first service provider to an administrative owner, an element template that identifies connectivity attributes including adjacencies and adaptation capabilities of the first resource domain, the adaptation capabilities indicating the existence of at least one adaptation function within the first resource domain, and the adaptation function being an ability of the first resource domain to receive a first transmission protocol and map the first transmission protocol onto a second transmission protocol.

2. The method of claim 1, wherein the publishing step is performed periodically.

3. The method of claim 1, wherein the publishing step is performed when an associated element is updated.

4. The method of claim 1, wherein the publishing step is performed when the first service provider receives a request to publish from the administrative owner.

5. The method of claim 1, wherein the publishing step is performed when a malfunction occurs in at least one of the first and second resource domains.

6. The method of claim 1, wherein the connectivity attributes include at least one of a geographical location, a regulatory constraint and a provisioning delay, of the first resource domain.

* * * * *